United States Patent
Jaradi et al.

(10) Patent No.: US 11,180,111 B2
(45) Date of Patent: Nov. 23, 2021

(54) SEATBELT RETRACTOR ASSEMBLY

(71) Applicant: Ford Global Technologies, LLC, Dearborn, MI (US)

(72) Inventors: Dean M. Jaradi, Macomb, MI (US); Mohammad Omar Faruque, Ann Arbor, MI (US); S. M. Iskander Farooq, Novi, MI (US); Michael James Whitens, Northville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 294 days.

(21) Appl. No.: 16/369,392

(22) Filed: Mar. 29, 2019

(65) Prior Publication Data

US 2020/0307508 A1 Oct. 1, 2020

(51) Int. Cl.
*B60R 22/34* (2006.01)
*B60R 22/28* (2006.01)

(52) U.S. Cl.
CPC .... *B60R 22/3413* (2013.01); *B60R 2022/287* (2013.01)

(58) Field of Classification Search
CPC ..... B60R 22/34; B60R 22/46; B60R 22/3413; B60R 2022/287; B60R 2022/3427
See application file for complete search history.

(56) References Cited

U.S. PATENT DOCUMENTS

| | | | |
|---|---|---|---|
| 5,961,060 | A | 10/1999 | Brambilla et al. |
| 6,012,667 | A | 1/2000 | Clancy, III et al. |
| 6,206,315 | B1 | 3/2001 | Wier |
| 6,309,023 | B2 | 10/2001 | Howell et al. |
| 6,568,621 | B2 | 5/2003 | Hiramatsu et al. |
| 7,954,854 | B2 | 6/2011 | Keller et al. |
| 10,040,421 | B2 | 8/2018 | Jaradi et al. |
| 2002/0134877 | A1* | 9/2002 | Glinka ............... B60R 22/3413 242/379.1 |
| 2004/0206844 | A1* | 10/2004 | Shiotani ............. B60R 22/3413 242/379.1 |
| 2006/0131456 | A1 | 6/2006 | Romero |
| 2018/0319363 | A1* | 11/2018 | Faruque ............... B60R 22/405 |

* cited by examiner

*Primary Examiner* — Sang K Kim
(74) *Attorney, Agent, or Firm* — Frank A. MacKenzie; Bejin Bieneman PLC

(57) ABSTRACT

A seatbelt retractor includes a spool. The seatbelt retractor includes a torsion bar elongated along an axis within the spool and defining passages elongated parallel to the axis, the passages spaced from each other surrounding the axis.

19 Claims, 5 Drawing Sheets

SEATBELT RETRACTOR ASSEMBLY

BACKGROUND

A vehicle restraint system includes a seatbelt assembly that secures an occupant to a seat during a vehicle collision. Specifically, the seatbelt assembly includes a retractor having a webbing that extends across the chest and lap of the occupant. The webbing is selectively payable from the retractor assembly. For example, the webbing is payable from the retractor assembly during normal operation of a vehicle and payout is restricted during a vehicle collision.

The restraint system may be equipped with "load limiting" features. During a collision, the retractor of the seat belt may lock the webbing from further extension from the retractor, but the load-limiting features permit some additional limited extension of the webbing when the force exerted on the webbing exceeds a load-limiting threshold. This additional extension of the webbing from the retractor limits the load applied by the webbing to occupant, e.g., to the chest of an occupant to reduce the chest deflection.

Load limiting may be achieved through use of a torsion bar. One end of the torsion bar may be connected to a spool around which the webbing is wound in the retractor. In the event of a collision, the other end of the torsion bar may be fixed. As an occupant exerts a force tending to extract the webbing from the retractor, the spool applies a twisting force to the torsion bar. The torsion bar yields, that is, deforms, at a known threshold force. The force imparted to an occupant through the seat belt is thus limited by the threshold force of the torsion bar.

DETAILED DESCRIPTION

Figure 1:
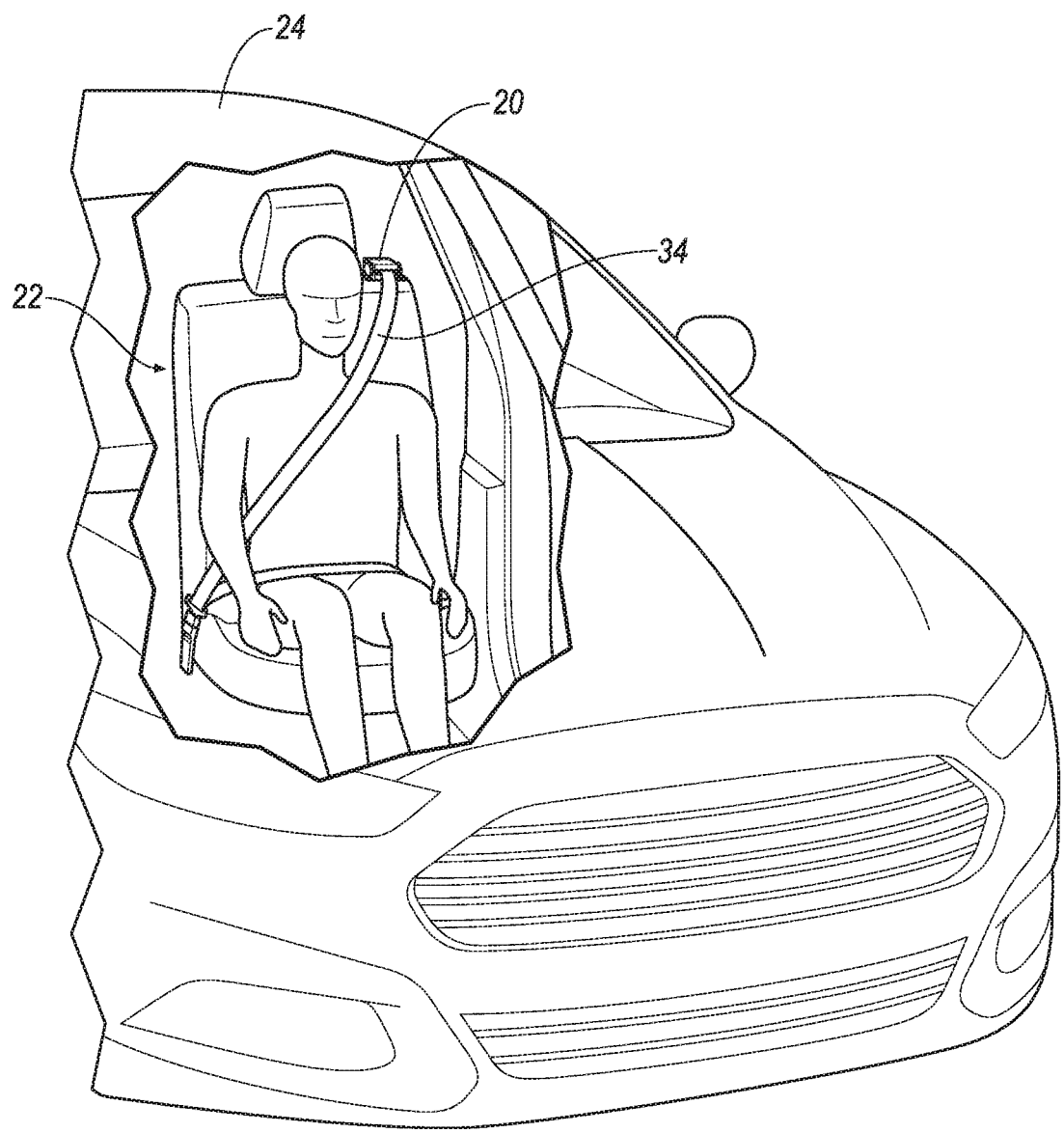
FIG. 1 is a perspective view of a vehicle having a restraint system.
Figure 2:
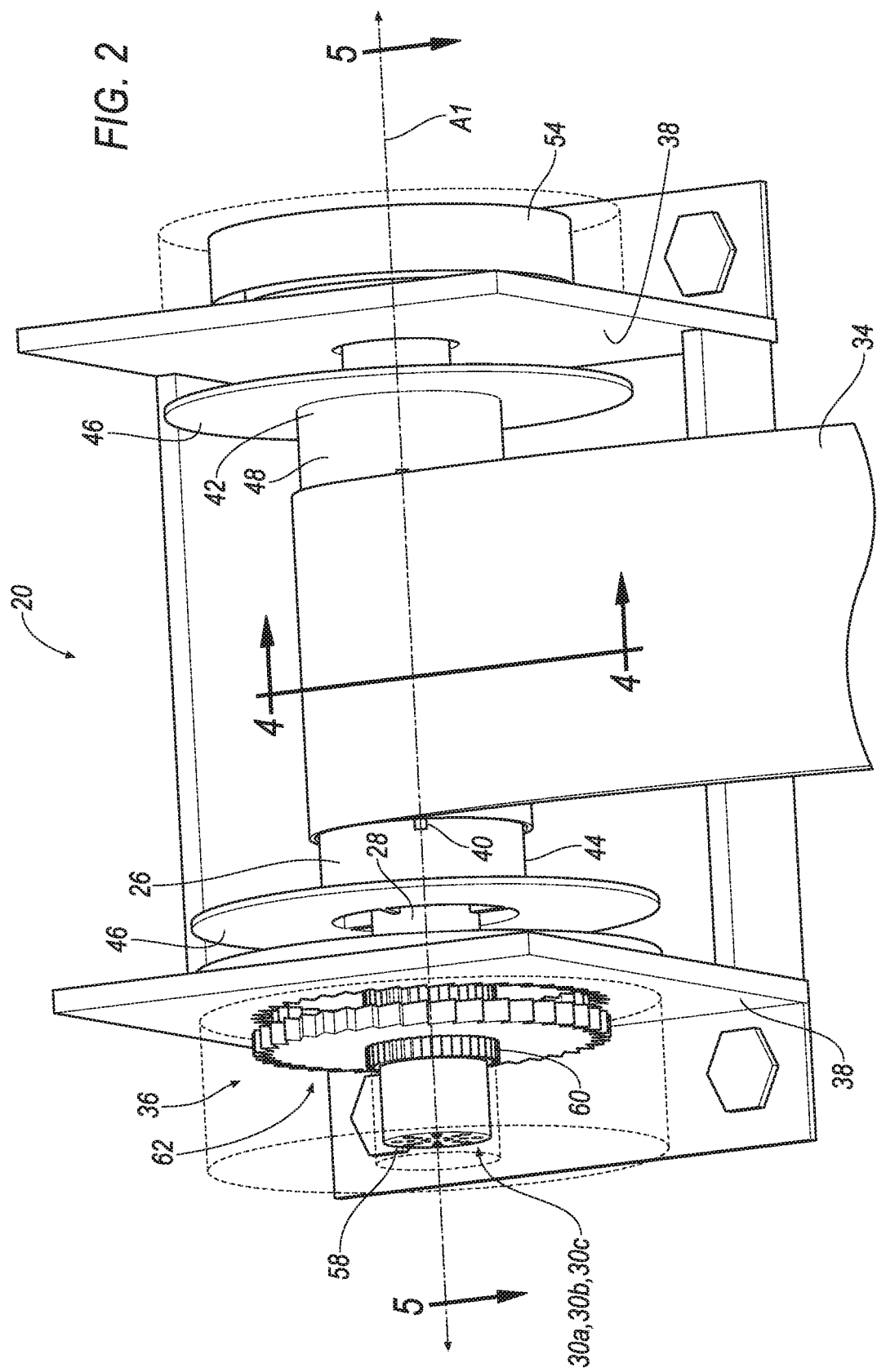
FIG. 2 is a perspective view of a retractor of the restraint system.
Figure 3:
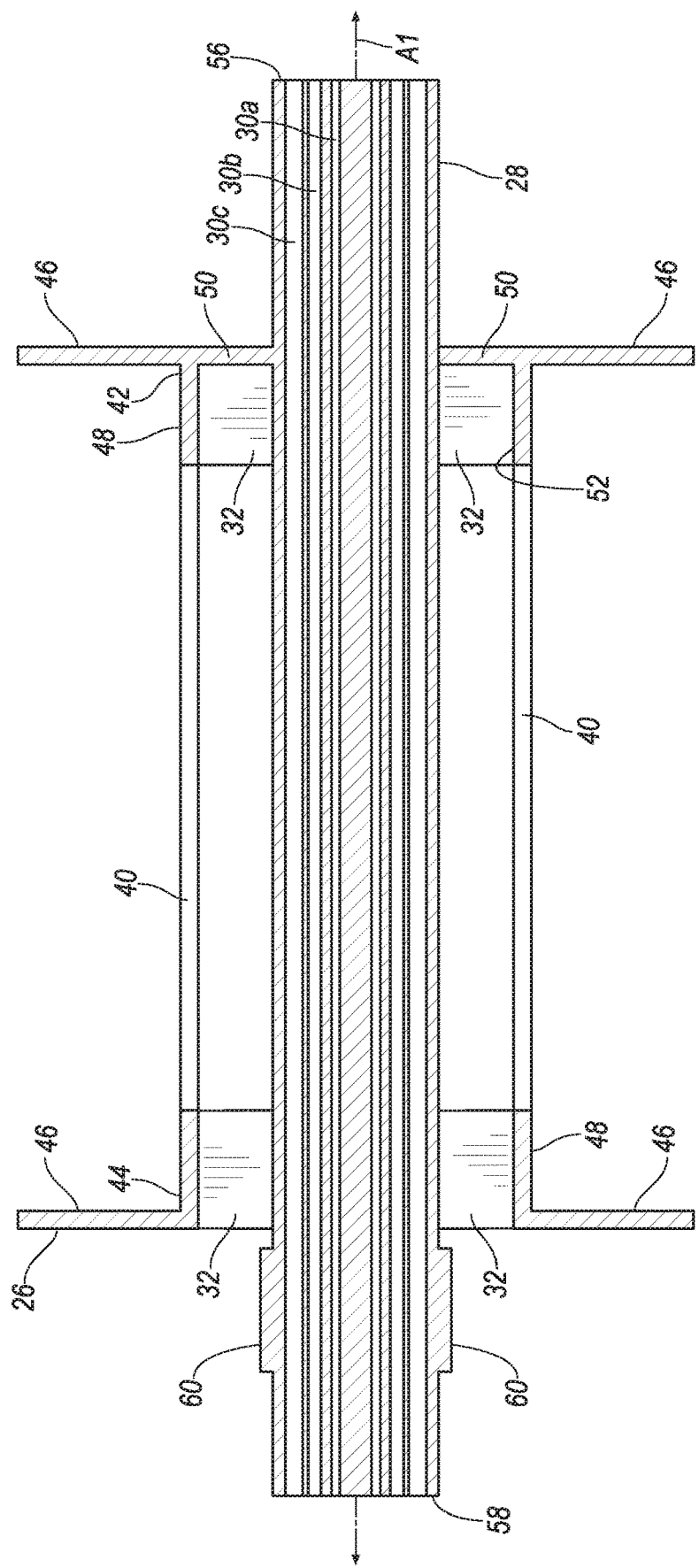
FIG. 3 is an axial cross section of a spool and a torsion bar of the retractor.
Figure 4:
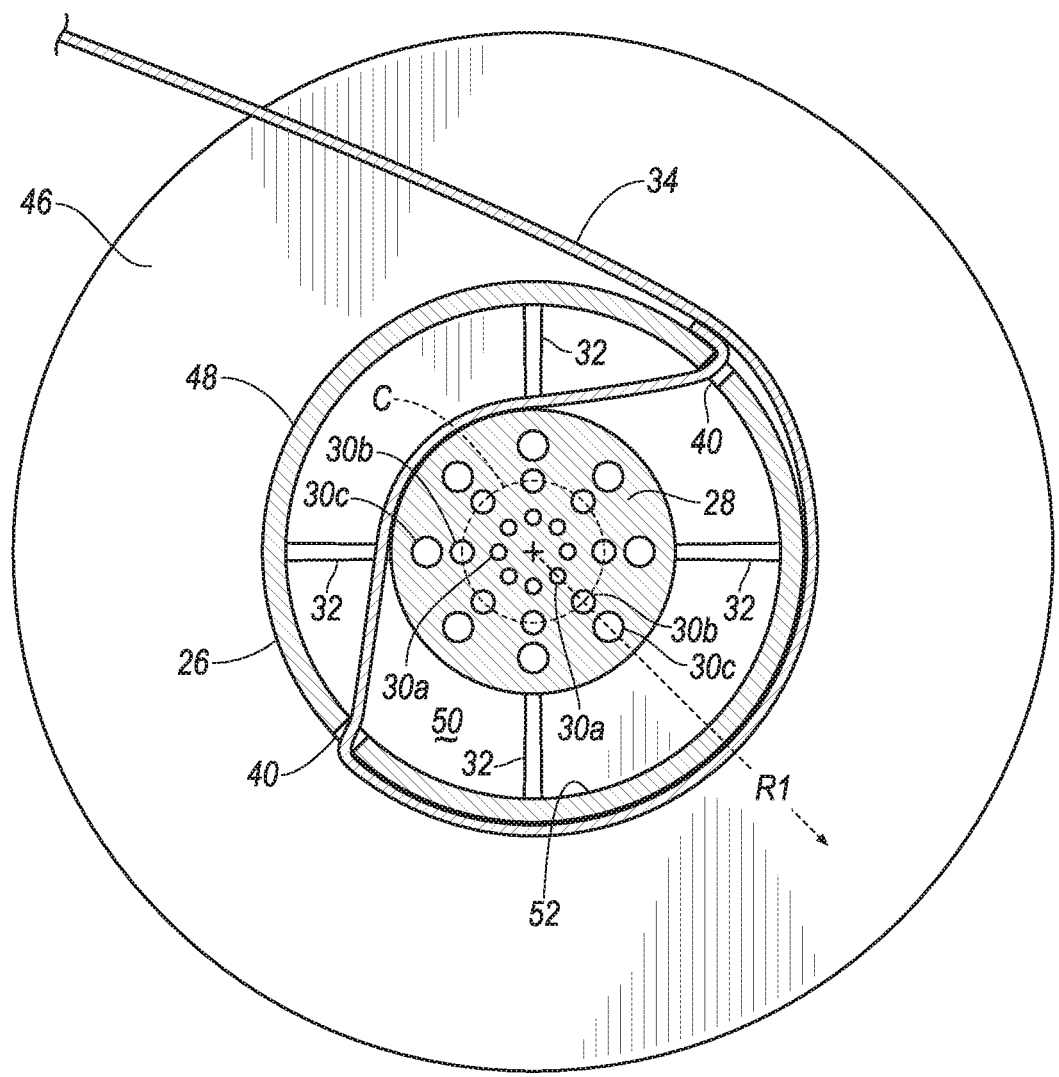
FIG. 4 is a radial cross section of the spool and the torsion bar of the retractor.

A seatbelt retractor includes a spool. The seatbelt retractor includes a torsion bar elongated along an axis within the spool and defining passages elongated parallel to the axis, the passages spaced from each other surrounding the axis.

The seatbelt retractor may include a base rotatably supporting the torsion bar.

The seatbelt retractor may include a locking device operatively coupling the base to the torsion bar.

The passages are arranged in a circular pattern around the axis.

The seatbelt retractor may include a webbing supported by the spool.

The torsion bar may have a first distal end and a second distal end, each on the axis, and the passages extend through the first distal end and the second distal end.

The passages may be cylindrical.

The torsion bar may define second passages surrounding the axis.

The passages may be closer to the axis than the second passages.

The passages may be smaller than the second passages.

A cross-sectional area of the passages perpendicular to the axis may be smaller than a cross-sectional area of the second passages perpendicular to the axis.

The passages may be radially aligned with the second passages relative to the axis.

A seatbelt retractor includes a torsion bar elongated along an axis. The seatbelt retractor includes a spool surrounding the torsion bar. The seatbelt retractor includes ribs extending radially relative to the axis from the torsion bar to the spool. The seatbelt retractor includes a webbing supported by the spool.

The seatbelt retractor may include a base rotatably supporting the torsion bar.

The torsion bar, spool, and ribs may be monolithic.

The spool may define a slot, the webbing in the slot.

The ribs may be spaced along the axis.

The seatbelt retractor may include teeth supported by the torsion bar.

The teeth and the torsion bar may be monolithic.

The torsion bar may define passages elongated parallel to the axis, the passages surrounding the axis.

With reference to the Figures, wherein like numerals indicate like parts throughout the several views, a seatbelt retractor 20 for a restraint system 22 of a vehicle 24 includes a spool 26. The seatbelt retractor 20 includes a torsion bar 28 elongated along an axis A1 within the spool 26 and defining passages 30*a*, 30*b*, 30*c* elongated parallel to the axis A1. The passages 30*a*, 30*b*, 30*c* are spaced from each other surrounding the axis A1. Ribs 32 extend radially relative to the axis A1 from the torsion bar 28 to the spool 26. A webbing 34 is supported by the spool 26.

The passages 30*a*, 30*b*, 30*c* of the torsion bar 28 enable the seatbelt retractor 20 to have multiple load-limiting phases. In other words, the passages 30*a*, 30*b*, 30*c* effect deformation characteristics of the torsion bar 28 such that an amount of webbing 34 paid out from the seatbelt retractor 20 varies based on amount of force applied to the webbing 34, e.g., during a vehicle impact.

The vehicle 24 may be any type of passenger or commercial automobile such as a car, a truck, a sport utility vehicle, a crossover vehicle, a van, a minivan, a taxi, a bus, etc.

The vehicle 24 may include a body and a frame. The body and frame may be of a unibody construction. In the unibody construction, the body, e.g., rockers, serves as the vehicle 24 frame, and the body (including the rockers, pillars, roof rails, etc.) is unitary, i.e., a continuous one-piece unit. As another example, the body and frame may have a body-on-frame construction (also referred to as a cab-on-frame construction). In other words, the body and frame are separate components, i.e., are modular, and the body is supported on and affixed to the frame. Alternatively, the body and frame may have any suitable construction. The body and/or the frame may be formed of any suitable material, for example, steel, aluminum, etc.

The vehicle 24 includes a passenger cabin to house occupants, if any, of the vehicle 24. The passenger cabin includes one or more seats. The seat is shown to be a bucket seat, but the seats may be other types. The position and orientation of the seats and components thereof may be adjustable by an occupant.

The restraint system 22 restrains an occupant of the vehicle 24 and helps to control movement of the occupant during an impact to the vehicle 24. The restraint system 22 may include one or more anchors, the seatbelt retractor 20, the webbing 34, a buckle and latch plate, etc. For example, the restraint system 22 may be a three-point harness, meaning that the webbing 34 is attached at three points around the occupant when fastened. The webbing 34 may be attached at the three points by the anchors, the seatbelt retractor 20, and the buckle and latch plate. The restraint system 22 may, alternatively, include another arrangement of attachment points.

The seatbelt retractor 20 provides payout and retraction of the webbing 34, e.g., enabling a length of the webbing 34 outside the retractor 20 to accommodate various sized occupants. The seatbelt retractor 20 selectively locks to restrict movement of the webbing 34, e.g., during an impact to the vehicle 24. For example, the seatbelt retractor 20 may include a locking device 36 which triggers to releasably lock the webbing 34, e.g., upon application of force to the webbing 34 by the occupant during the impact to the vehicle 24. The seatbelt retractor 20 may unlock the webbing 34 when the force is removed from the webbing 34 to allow for payout and retraction of the webbing 34 from the retractor 20.

The seatbelt retractor 20 may be supported at various locations of the vehicle 24. For example, the seatbelt retractor 20 may include a base 38. The base 38 may be fixed to the frame and/or body of the vehicle 24, to a pillar, roof, floor, etc., of the vehicle 24. As another example, the base 38 may be fixed to a frame of the seat of the vehicle 24. The base 38 may be fixed via fastener, welding, etc.

The spool 26 supports the webbing 34. For example, the spool 26 may define one or more slots 40. The webbing 34 may be in the slots 40 and wound around the spool 26. The webbing 34 may be formed of a fabric in the shape of a strap. The spool 26 is rotatably supported by the base 38, e.g., to rotate about the axis A1 while the locking device 36 is unlocked. The spool 26 may be a cylinder elongated between a first end 42 and a second end 44. The slots 40 may be elongated parallel to the axis A1 and be between the ends 42, 44. The spool 26 may include a pair of outwardly extending flanges 46. The flanges 46 maintain positioning of the webbing 34 relative to the spool 26. The flanges 46 extend radially away from the axis A1 from an outer surface 48 of the spool 26. The flanges 46 may be at the ends 42, 44. The webbing 34 may be between the flanges 46. The spool 26 may include an inwardly extending flange 50 connecting the spool 26 to the torsion bar 28. The flange 50 transfers torque from spool 26 to the torsion bar 28. The flange 50 extends radially toward the axis A1 from an inner surface 52 of the spool 26 at the first end 42. The adjectives "first," "second," "third," etc., are used throughout this document as identifiers and are not intended to signify importance or order.

A spool spring 54 may be coupled to the spool 26 and the base 38, e.g., at the first end 42. The spool spring 54 may be loaded in tension or compression when the webbing 34 is fully retracted, and the spool spring 54 may be further loaded in either tension or compression when the webbing 34 is extended from the spool 26. Thus, the spool spring 54 may exert a force tending to retract the webbing 34. The spool spring 54 may be a spiral torsion spring or any other suitable type of spring.

The torsion bar 28 may be designed to rotationally yield, e.g., plastically deform, as the torsion bar 28 is rotated by the spool 26 but fixed by the locking device 36. In particular, the torsion bar 28 may be formed of suitable shape, dimension, and material to yield when subjected to a threshold rotational force. For example, if the locking device 36 is in the locked position and the webbing 34 exerts a rotational force on the spool 26, the torsion bar 28 may prevent the spool 26 from rotating unless the force exceeds a threshold, in which case the rotational yielding of the torsion bar 28 may permit the spool 26 to rotate. Thus, the load held by the webbing 34 is limited.

The torsion bar 28 may be rotatably supported by the base 38. In other words, the torsion bar 28 may be supported by the base 38, e.g., in an opening of the base 38, and the torsion bar 28 may be rotatable relative to the base 38, e.g., about the axis A1 and when the locking device 36 is unlocked.

The torsion bar 28 is elongated along the axis A1. The torsion bar 28 has a first distal end 56 and a second distal end 58. The torsion bar 28 is elongated between the distal ends 56, 58. The distal ends 56, 58 are on the axis A1.

The torsion bar 28 is within the spool 26. In other words, the spool 26 surrounds the torsion bar 28. For example, the torsion bar 28 and the spool 26 may be concentrically arranged, e.g., centered, on the axis A1. The first distal end 56 of the torsion bar 28 is proximate the first end 42 of the spool 26, i.e., closer to the first end 42 of the spool 26 than the second end 44 of the spool 26. The second distal end 58 of the torsion bar 28 is proximate the second end 44 of the spool 26, i.e., closer to the second end 44 of the spool 26 than the first end 42 of the spool 26. The torsion bar 28 may be operatively coupled to the spool 26 to transmit torque there between. For example, the inwardly extending flange 50 of the spool 26 may be fixed to the torsion bar 28 proximate the first distal end 56. For example, the flange 50 may be welded to the torsion bar 28. As another example, the spool 26 and the torsion bar 28 may be monolithic, i.e., a one-piece unit without any fasteners, joints, welding, adhesives, etc., fixing the spool 26 and the torsion bar 28 to each other. As another example, the inwardly extending flange 50 may define a keyed opening and the first distal end 56 of the torsion bar 28 may be keyed to fit with the keyed opening to inhibit relative rotation between the torsion bar 28 and the spool 26 (not shown).

The torsion bar 28 defines the plurality of passages 30a, 30b, 30c. The passages 30a, 30b, 30c affect deformation characteristics of the torsion bar 28, e.g., an amount of force required to deform the torsion bar 28. The passages 30a, 30b, 30c are elongated parallel to the axis A1. The passages 30a, 30b, 30c may extend through the first distal end 56 and the second distal end 58. In other words, the passages 30a, 30b, 30c may be open at the distal ends 56, 58. The passages 30a, 30b, 30c may be cylindrical defining a length and a diameter. The passages 30a, 30b, 30c are spaced from each other and surround the axis A1. For example, the passages 30a, 30b, 30c may be arranged in a circular pattern C around the axis A1. Some of the passages 30a, 30b may be closer to the axis A1 than other passages 30b, 30c. In other words, the passages 30a, 30b, 30c may be radially spaced from each other relative to the axis A1. For example, the passages 30a, 30b, 30c may be arranged in sets, e.g., a set of first passages 30a, a set of second passages 30b, and a set of third passages 30c. The passages 30a, 30b, 30c of each set may be in a circular pattern C. The sets of passages 30a, 30b, 30c may be concentrically arranged relative to the axis A1. For example, the first set of passages 30a may be closest to the axis A1, the third set of passages 30c may be furthest from the axis A1, and the second set of passages 30b may be between the passages 30a, 30c of the first and third sets. Some of the passages 30a, 30b, 30c may be radially aligned with other passages 30a, 30b, 30c relative to the axis A1. For example, one of the passages 30a of the first set, one of the passages 30b of the second set, and one of the passages 30c of the third set may all be on a common radius R1 of the axis A1.

Some of the passages 30a, 30b may smaller than the other passages 30b, 30c. For example, a diameter of some of the passages 30a, 30b may be smaller than a diameter of other passages 30b, 30c. As another example, a cross-sectional area of some of the passages 30a, 30b may be smaller than a cross-sectional area of other passages 30b, 30c, e.g., when the cross-sectional areas are taken perpendicular to the axis A1. Passages 30a, 30b closer to the axis A1 may be smaller than passages 30b, 30c further from the axis A1. For example, the passages 30b of the second set may be smaller than the passages 30c of the third set, and the passages 30a of the first set may be smaller than the passages 30b of the second set.

Teeth 60 may be supported by the torsion bar 28. The teeth 60 enable the looking device to engage the torsion bar 28 and restrict rotation of the torsion bar 28 relative to the base 38. For example, the teeth 60 may be ratchet teeth configured to engage with a pawl 62 of the locking device 36. The teeth 60 and the torsion bar 28 may be monolithic. The teeth 60 may be proximate the first distal end 56 of the torsion bar 28.

The retractor 20 may include ribs 32 extending radially relative to the axis A1 from the torsion bar 28 to the spool 26. The ribs 32 support the spool 26 and the torsion bar 28 relative to each other. The ribs 32 may flex or otherwise deform when torque is allied to the torsion bar 28 from the spool 26 while the locking device 36 is locked. The ribs 32 may be fixed to the torsion bar 28 and/or the spool 26, e.g., via weld, etc. The torsion bar 28, spool 26, and ribs 32 may be monolithic.

The ribs 32 may be spaced from each other along the axis A1. For example, one or more ribs 32 may be at the first end 42 of the spool 26, and one or more ribs 32 may be at the second end 44 of the spool 26. The webbing 34 may be between the ribs 32 at the first end 42 of the spool 26 and the ribs 32 at the second end 44 of the spool 26.

The locking device 36 operatively couples the base 38 to the torsion bar 28. The locking device 36 is movable between an unlocked position in which rotation of the second end 44 of the torsion bar 28 relative to the base 38 is permitted, and the locked position in which rotation of the second end 44 of the torsion bar 28 relative to the base 38 is restricted. The locking device 36 may move from the unlocked position to the locked position during an impact to the vehicle 24.

For example, each tooth 60 may include a first side and a second side. The first side has a shallower angle than the second side. When the teeth 60 rotate relative to the pawl 62 such that the first sides of the teeth 60 are presented to the pawl 62, the pawl 62 slides over the teeth 60, and when the teeth 60 rotate relative to the pawl 62 such that the second sides of the teeth 60 are presented to the pawl 62, the pawl 62 catches on the second side and prevents rotation of the teeth 60. The pawl 62 may be hingedly coupled to the base 38. The pawl 62 is movable between the unlocked position spaced from the teeth 60 and the locked position engaging the teeth 60. The pawl 62 has a hinged end and a free end. In the unlocked position, the free end is spaced from the teeth 60. In the locked position, the free end is touching the teeth 60.

The locking device 36 may include an activation sensor (not shown) that senses sudden deceleration of the vehicle 24 and triggers activation of the locking device 36, e.g., to engage the teeth 60 and pawl 62. The activation sensor may be in communication with the pawl 62, either directly or indirectly through a controller (not shown). The activation sensor may be located in the retractor 20 or elsewhere in the vehicle 24. In the retractor 20, the activation sensor may be, for example a weighted pendulum, a centrifugal clutch, or any other suitable type. In the vehicle 24 outside the retractor 20, the activation sensor may be, for example, post-contact sensors such as accelerometers, pressure sensors, and contact switches; pre-impact sensors such as radar, lidar, and vision-sensing systems; or any other suitable type. The vision systems may include one or more cameras, CCD image sensors, CMOS image sensors, etc.

Figure 5:
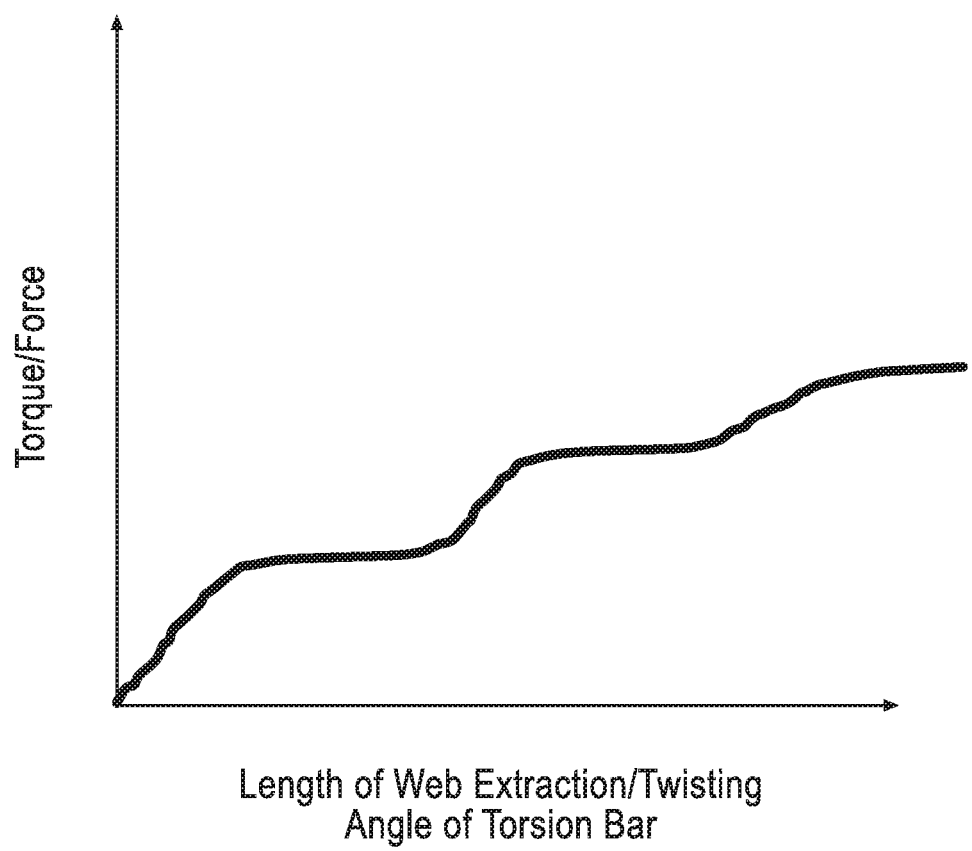
FIG. 5 is a plot of torque of the torsion bar over time.

During normal operation of the vehicle 24 the locking device 36 is in the unlocked position. In the event of a sudden impact, the activation sensor may trigger the locking device 36, e.g., to engage the pawl 62 with the teeth 60. The pawl 62 may move from the unlocked position to the locked position, engaging the teeth 60. At the same time, inertia of the occupant pushes the occupant against the webbing 34. The tensile force in the webbing 34 tends to pull the webbing 34 from the spool 26. The teeth 60, connected to the spool 26 through the torsion bar 28, may prevent rotation of the spool 26 until the tensile force in the webbing 34 exceeds one or more the force thresholds and the torsion bar 28 deforms. The passages 30a, 30b, 30c provide defamation of the torsion bar 28 at progressive amounts of loading. For example, when the force exceeds a lowest threshold, e.g., 4 kilonewtons, the torsion bar 28 deforms at the first set of the passages 30a. When the force exceeds a higher threshold, e.g., 6 kilonewtons, the torsion bar 28 deforms at the second set of passages 30b. When the force exceeds a highest threshold, e.g., 8 kilonewtons, the torsion bar 28 deforms at the third set of passages 30c. A plot of webbing 34 extraction from the retractor 20 (or deformation of the torsion bar) as increased torque is applied is shown in FIG. 5. The plot illustrates the loading phases of the retractor 20 with the various steps in the plot. Thus, the load limiting of the retractor 20 has multiple load-limiting phases.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. A seatbelt retractor, comprising:
   a torsion bar elongated along an axis;
   a spool surrounding the torsion bar;
   ribs extending radially relative to the axis from the torsion bar to the spool, the ribs spaced from each other along the axis; and
   a webbing supported by the spool.

2. The seatbelt retractor of claim 1, further comprising a base rotatably supporting the torsion bar.

3. The seatbelt retractor of claim 1, wherein the torsion bar, spool, and ribs are monolithic.

4. The seatbelt retractor of claim 1, wherein the spool defines a slot, the webbing in the slot.

5. The seatbelt retractor of claim 1, further comprising teeth supported by the torsion bar.

6. The seatbelt retractor of claim 5, wherein the teeth and the torsion bar are monolithic.

7. The seatbelt retractor of claim 1, wherein the torsion bar defines passages elongated parallel to the axis, the passages surrounding the axis.

8. A seatbelt retractor, comprising:
   a spool; and
   a torsion bar elongated along an axis within the spool and defining passages elongated parallel to the axis, the passages spaced from each other surrounding the axis, the torsion bar having a first distal end and a second distal end, each on the axis, and the passages extending through the first distal end and the second distal end.

9. The seatbelt retractor of claim 8, further comprising a base rotatably supporting the torsion bar.

10. The seatbelt retractor of claim 9, further comprising a locking device operatively coupling the base to the torsion bar.

11. The seatbelt retractor of claim 8, wherein the passages are arranged in a circular pattern around the axis.

12. The seatbelt retractor of claim 8, further comprising a webbing supported by the spool.

13. The seatbelt retractor of claim 8, wherein the passages are cylindrical.

14. The seatbelt retractor of claim 8, wherein the torsion bar defines second passages surrounding the axis.

15. The seatbelt retractor of claim 14, wherein the passages are closer to the axis than the second passages.

16. The seatbelt retractor of claim 14, wherein the passages are smaller than the second passages.

17. The seatbelt retractor of claim 14, wherein a cross-sectional area of the passages perpendicular to the axis is smaller than a cross-sectional area of the second passages perpendicular to the axis.

18. The seatbelt retractor of claim 14, wherein the passages are radially aligned with the second passages relative to the axis.

19. A seatbelt retractor, comprising:
a torsion bar elongated along an axis;
a spool surrounding the torsion bar;
ribs extending radially relative to the axis from the torsion bar to the spool, and the torsion bar, spool, and ribs are monolithic;
and
a webbing supported by the spool.

* * * * *